June 13, 1950
G. C. FREEMAN
2,511,200
CHRISTMAS TREE HOLDER
Filed July 7, 1947
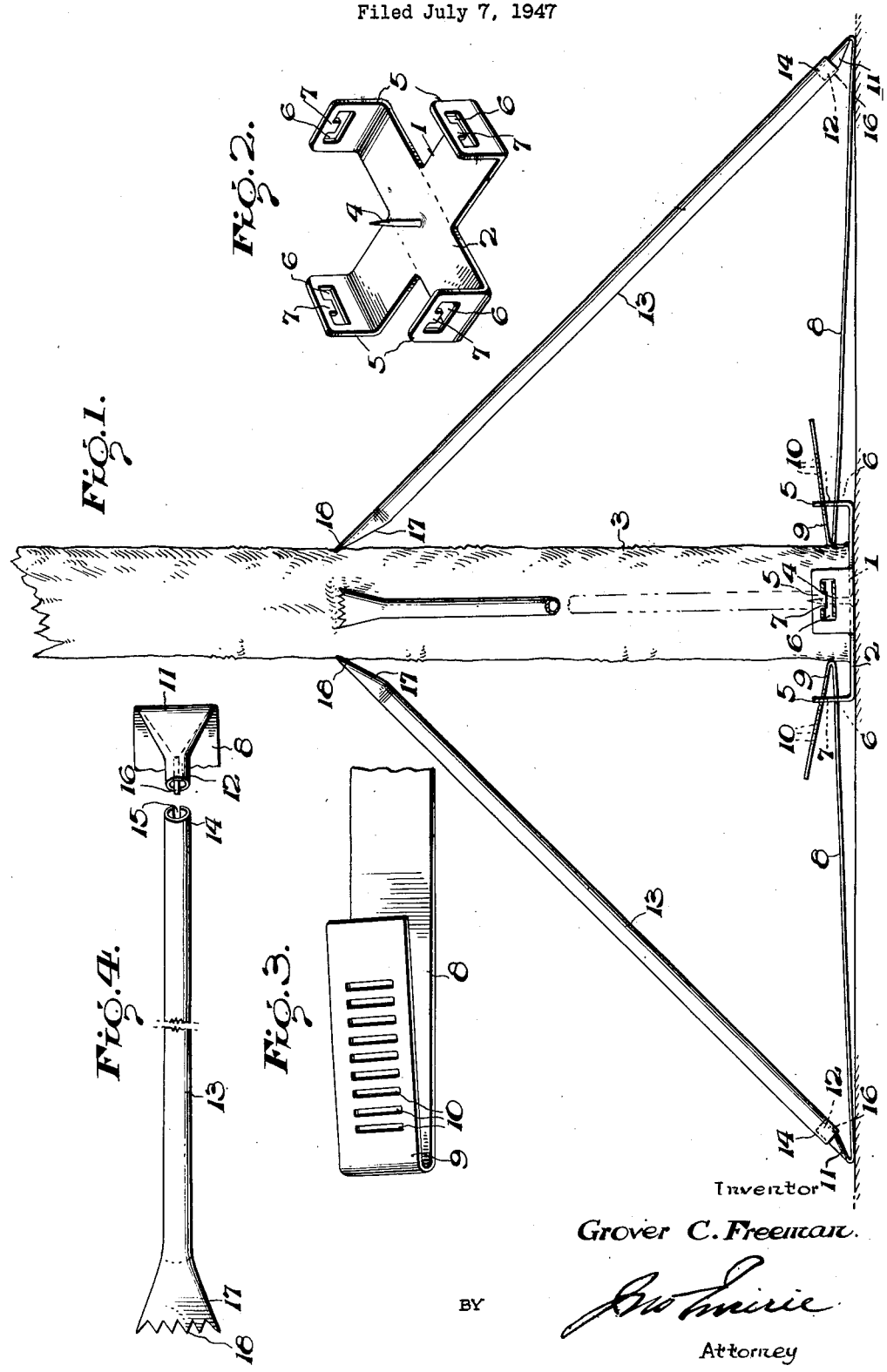
Inventor
Grover C. Freeman
BY
Attorney Patented June 13, 1950

2,511,200

UNITED STATES PATENT OFFICE 2,511,200

CHRISTMAS TREE HOLDER

Grover C. Freeman, Fort Leavenworth, Kans.

Application July 7, 1947, Serial No. 759,456

3 Claims. (Cl. 248—48)

This invention is directed to an improvement in Christmas tree holders constructed preferably of metal and formed in separate sections, adapted to cooperate with each other and with the tree to hold the tree in an upright fixed relation, and to be as readily disassembled when not required for use with the tree.

The primary object of the present invention is the provision of a tree holder in which the various parts are formed for simple and easy association in tree holding relation, and wedged against separation in that relation to insure a rigid formation when in cooperation with the tree, while permitting free adjustment in tree engagement to readily accommodate trees of different diameter trucks.

The invention is illustrated in the accompanying drawings, in which:

Fig. 1 is a view in elevation with the holder in applied position to support the tree.

Fig. 2 is a perspective view of the base of the holder.

Fig. 3 is a broken perspective view of one of the bottom legs of the holder, illustrating particularly the wedging slots.

Fig. 4 is a plan view of one of the braces of the holder, showing the tree-engaging end and the end remote from the tree with the connected terminal of the legs to receive that end of the brace.

The improved holder comprises a base 1, of two metallic sections 2, arranged in cruciform shape and each having a length exceeding the diameter of the tree trunk 3, to which the holder is to be applied. The holder is provided with a central rigidly secured pin or spike 4 extending upwardly to be driven into the bottom of the tree trunk 3, as shown in Fig. 1.

The ends of the base strips 2 are bent upwardly at right angles as at 5 and each formed with a transverse slot 6 having a portion of the upper edge of the slot wall for a length less than that of the slot, depending, as at 7 to provide a locking member or catch for cooperation with one of the legs 8, as will be later described.

The legs 8 are in the form of an elongated strip, having a width to slidably fit in the slots 6 in the base. The ends of the legs are integrally formed as angularly related spring strips 9 and these strips, as shown in Fig. 3 are formed with transverse slots 10 to cooperate with one of the catches 7 in the base 1. The ends of the legs remote from the spring end 9 are formed to provide a holder 11 turned upwardly from the end of the leg and terminally formed to provide a rounded projection 12 which overlies the upper surface of the leg and extends toward the spring end 9 of the leg.

Brace strips 13 are provided, preferably, but not necessarily, of circular form and terminating at one end in a socket 14 to slidably telescope the projection 12, the socket 14 having a recess 15 to engage a lip 16 in the end of the projection 11 to prevent a relative rotation of the parts when the brace is in cooperation with the projection. The opposite end of the brace is preferably widened at 17 and terminally formed with a series of sharpened projections or teeth 18 to engage the tree.

The holder is asembled by driving the pin 4 of the base in the bottom of the tree so as to equally space the locking terminals 5 on each side of and beyond the tree trunk. The tree is then held upright and the legs 8 are assembled by forcing the spring strips 9 into the respective slot 6 of the base until the terminal of each strip bears against the surface of the tree and the slots 10 in the spring strip interlocking with the projections 7 of the base.

The braces 13 are then applied, their socket ends 14 being applied to interfit with the projections 12 of the legs, whereupon the free or roughened ends 17 of the braces 13 are slightly raised and then forced downwardly to cause the teeth 18 to be forced into the material or bark of the tree trunk 3.

The tree trunk is thus braced in four directions from the base 1, with the parts forming the bracing interlocked in a manner to prevent their casual separation under any jar to which the tree may be subjected. The holder may be readily separated from the tree by removing the braces 13 from the ends of the legs, depressing the spring strips 9 to disengage the projections 7 from the slots 10, withdrawing the legs from the slots 6 of the base and separating the base from the tree trunk.

The holder is preferably, but not necessarily made of light weight strapping steel, and the various parts are stamped or formed in readily convenient manner, made, of course, in various sizes to accommodate trees having trunks of widely varying diameter.

What is claimed as new is:

1. A Christmas tree holder having a base, a pin carried by the base, to be driven into the bottom of the tree, the base being formed with uprights each having an interlocking slot and a holding lip in each slot, a leg for cooperation with each upright and having a spring strip terminal for insertion in the slot in the upright with such terminal formed with a slot to receive the lip for locking the spring terminal to the base, the opposite end of the leg having an upstanding projection, and brace rods having a socket at one end to slidably engage the upstanding projection of the respective leg and a tooth at the opposite end to be forced into the tree.

2. A Christmas tree holder having a base, a pin carried by the base, to be driven into the bottom of the tree, the base being formed with uprights each having an interlocking slot and a holding lip in each slot, a leg for cooperation with each upright and having a spring strip terminal for insertion in the slot in the upright with such terminal formed with a slot to receive the lip for locking the spring terminal to the base, brace rods secured at one end with the respective leg and having a tooth on the opposite end to be forced into the tree.

3. A Christmas tree holder having a base, a pin carried by the base, to be driven into the bottom of the tree, the base being formed with uprights each having an interlocking slot and a holding lip in each slot, a leg for cooperation with each upright and having a spring strip terminal for insertion through the slot in the upright for abutment against the tree trunk, said spring strip terminal having a plurality of slots to selectively receive the lip for locking the spring terminal to the base with said spring strip terminal bearing against the tree trunk, the opposite end of each leg having an upstanding projection, and brace rods having a socket at one end to slidably engage the respective upstanding projection and a tooth at the opposite end to be forced into the tree.

GROVER C. FREEMAN.

REFERENCES CITED

The following references are of record in the file of this patent:

UNITED STATES PATENTS

| Number | Name | Date |
|---|---|---|
| 2,410,227 | Mathews | Oct. 29, 1946 |
| 2,416,435 | Carlberg | Feb. 25, 1947 |